United States Patent [19]
Lay et al.

[11] 3,794,814
[45] Feb. 26, 1974

[54] CONTINUOUS DYNAMIC ERROR MONITORING DEVICE FOR NUMERICALLY CONTROLLED MACHINES

[75] Inventors: Clark M. Lay, Clinton; James H. Burkhardt, Jr., Knoxville; Thomas W. Davidson, Oak Ridge, all of Tenn.

[73] Assignee: The United States of America as represented by the United States Atomic Energy Commission, Washington, D.C.

[22] Filed: Feb. 15, 1973

[21] Appl. No.: 332,944

[52] U.S. Cl. ... 235/92 MP, 235/92 EV, 235/151.11, 340/347 AD
[51] Int. Cl. ... G01b 11/04, G06g 7/00, H03k 13/00
[58] Field of Search. 235/151.1 PL, 151.11, 92 MP, 235/92 EV, 92 EA; 340/347 AD

[56] References Cited
UNITED STATES PATENTS
3,609,315  9/1971  Rogers ................... 235/92 MP X
3,549,870  12/1970  Lay ........................... 235/92 MP
3,588,462  6/1971  Kreckel et al. .............. 235/92 MP

*Primary Examiner*—Thomas J. Sloyan
*Attorney, Agent, or Firm*—John A. Horan; David S. Zachry; David E. Breeden

[57] ABSTRACT

A dynamic error monitoring system has been provided which measures the instantaneous value of a positionable machine member by direct, instantaneous and continuous comparison between movement command pulses of a discrete value with pulses of the same discrete value from an independent distance measuring device such as command pulses from a numerical control unit and pulses from an interferometer indicative of the positionable member movement from a reference position. Command pulses from the numerical control unit are compared with the laser-interferometer-derived pulses in a bidirectional counter following suitable scaling, steering, and anticoincidence testing. The net count output of the counter representing the dynamic error is converted to an analog signal that is displayed on a recorder. The system gives a continuous record of the dynamic machine tool position over the entire length of the positionable member travel as well as the static positioning error.

7 Claims, 3 Drawing Figures

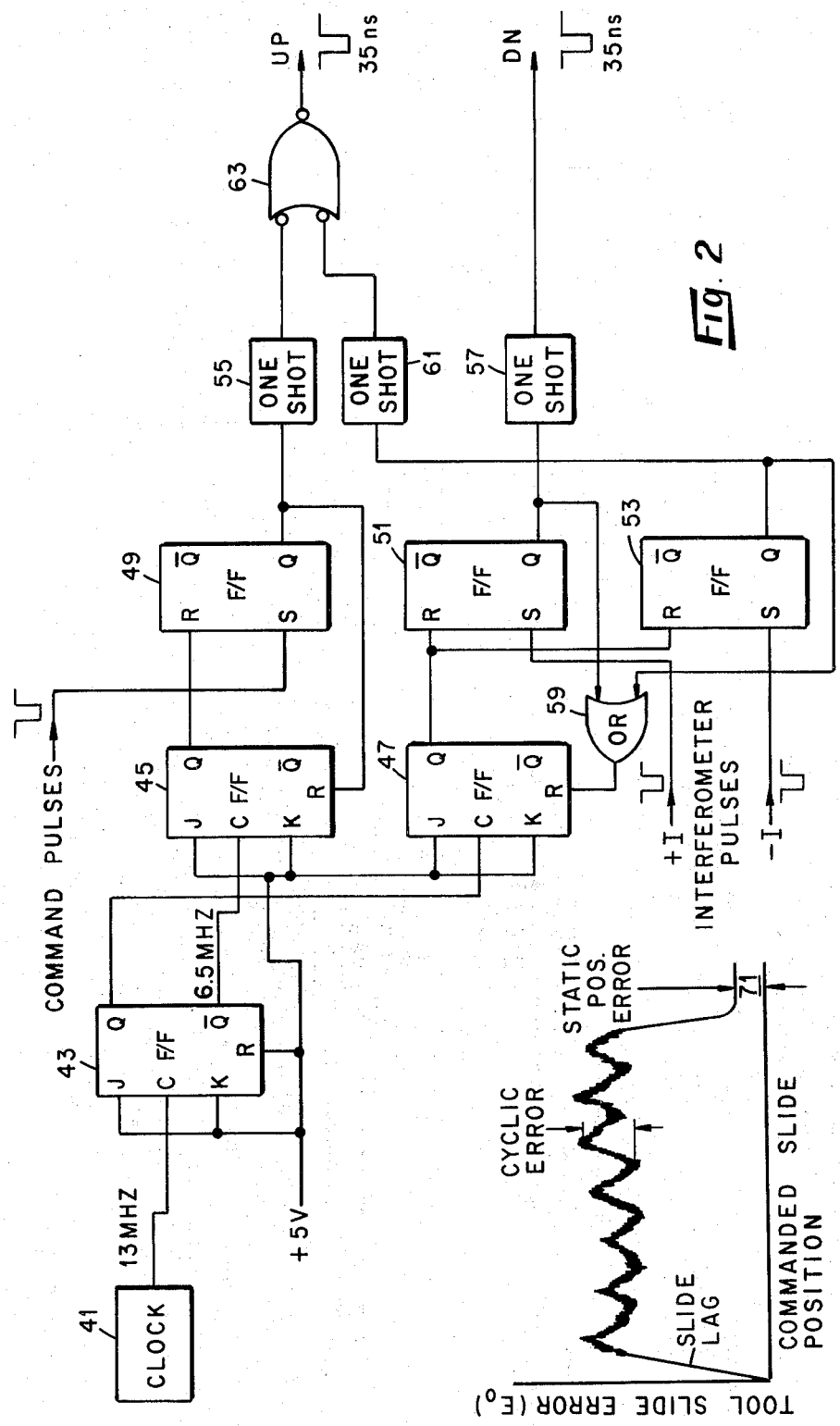

CONTINUOUS DYNAMIC ERROR MONITORING DEVICE FOR NUMERICALLY CONTROLLED MACHINES

BACKGROUND OF THE INVENTION

The present invention was made during the course of, or under, a contract with the United States Atomic Energy Commission.

This invention relates generally to numerically controlled machines and more specifically to a system for measuring the dynamic and static error associated with these machines.

In production plants many parts are cut on numerically controlled (NC) machines in which programmed command pulses are used to control the machine drive for various tool or workpiece positioning members. The tool slides and workpiece slides of these machines have in the past been calibrated by checking the static error at approximately one inch increments against a standard bar (Moore bar) mounted on the machine for this purpose. This method is time consuming and does not check for dynamic slide position error or indicate the amount of machine drive lag. These dynamic errors are frequently the cause of out of tolerance parts, poor surface finish and excessive machine maintenance and down time.

Therefore, it will be obvious that there is a need for a system which will quickly determine both the static and dynamic absolute error between the commanded position of, for example, a tool slide and the actual slide position.

Various prior art systems have been provided which employ a reversible counter for keeping track of the net error between NC machine command pulses and position indicative feedback pulses wherein the net error output is used to position the movable member toward zero error. However, these systems do not provide the dynamic error of the movable member along its path which is the purpose of the present invention.

REFERENCED PATENTS

U. S. Pat. No. 3,549,870 to Clark M. Lay for "A System For Computing And Continuously Displaying Increments Of Movement Of An Object In Usable Units Of Measure."

SUMMARY OF THE INVENTION

In view of the above it is an object of this invention to provide a system for measuring the dynamic error of a movable member of a numerically controlled machine.

Another object of this invention is to provide a dynamic error monitoring system for a numerically controlled machining device which measures dynamic errors such as cyclic errors, following errors, movable member oscillation and position feedback errors which affect machining accuracy and part finish.

Yet another object of this invention is to provide a dynamic error monitoring system as set forth in the above objects in which the dynamic error is measured by a continuous readout of the difference between the machine commanded position and the actual position as measured by a feedback position indicator.

Briefly, the present invention is a dynamic error monitoring system for a numerically controlled machine wherein command pulses from a programmed numerical control unit which are fed to the machine drive for a positionable member are compared in a bidirectional counter with actual movement pulses (position pulses) generated by a resolver set to measure the positionable member movement. The pulses are fed through an anti-coincidence circuit to prevent the loss of simultaneous pulses so that the count stored in the counter is always the absolute instantaneous dynamic error of the system being checked. The count registered by the bidirectional counter is converted to an analog signal and continuously recorded to provide a dynamic error record over the path of the positionable member.

Other objects and many of the attendant advantages of the present invention will be apparent from the following detailed description taken in conjunction with the drawings.

BRIEF DESCRIPTION OF THE DRAWINGS

FIG. 2 is an electrical schematic diagram of the anti-coincidence circuit shown in block form in FIG. 1.

FIG. 3 is a typical strip chart record of a movement error of the tool slide measured by the system of FIG. 1.

DETAILED DESCRIPTION

Figure 1:
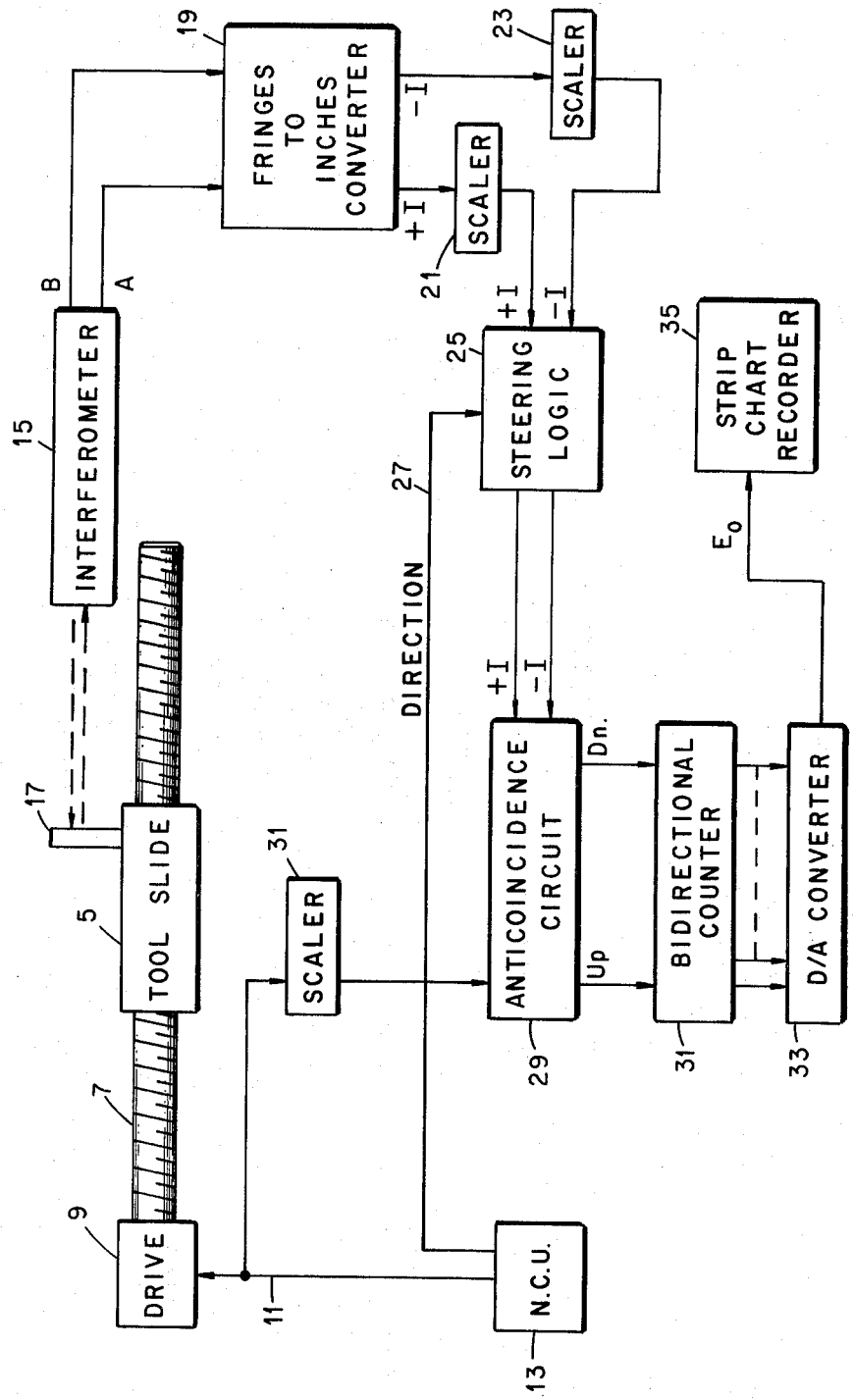
FIG. 1 is a schematic block diagram of a dynamic error monitoring system according to the present invention.

Referring now to FIG. 1 the system will be described as used to measure the error of a numerically controlled (NC) machine slide which could be, for example, the positionable member for a cutting tool of the machine. The tool slide 5 is positioned by a lead screw 7 rotated by a conventional drive unit 9. The drive unit 9 is activated by command pulses on line 11 supplied by a conventional numerical control unit 13.

An interferometer 15, such as a He-Ne laser-interferometer, is positioned to measure the displacement of the tool slide 5 by means of a reflector 17 mounted on the tool slide 5. The interferometer operates in a conventional manner in which quadrature sine wave outputs are generated on leads A and B which correspond to two 90° phase displaced fringe patterns sensed by the interferometer. Depending on the direction of movement of the slide 5, one of the output signals at the interferometer will lead the other by 90°. One cycle of the signals is generated each time the machine slide moves through a fringe distance (i.e., 12.457190 microinches). These signals are converted to pulses of uniform units of measure, such as 12.5 microinches, by a fringes-to-inches converter 19 connected to receive the lines A and B at its inputs. The fringes-to-inches converter is described in the above-referenced U. S. Pat. No. 3,549,870 which has a common assignee with the present invention.

Briefly, the converter 19 detects the leading one of the signals A or B and generates a square wave pulse at either the +1 or −1 outputs depending upon the direction of slide movement. Thus, each output pulse represents an assumed movement of 12.5 microinches. The counter 19 is further provided with logic circuitry which inhibits the passage of a pulse following the generation of 291 pulses in one direction so that the assumed 12.5 microinches displacement is corrected when the error accumulates to approximately 12.5 microinches. By dividing the error per pulse (0.042810)

into the distance assumed to be represented by the pulse (12.5), the number of pulses is obtained which can be generated in either direction before the cumulative error is almost exactly equal to the distance represented by one pulse or one fringe increment. This means that, after a slide movement equivalent to 291 pulses, the output can be corrected almost exactly if the next pulse, the 292nd, is eliminated or inhibited.

Even better correction of the converter 19 output can be obtained by centering the 292-count error (12.5 microinches) about the zero-error base line as described in the above-referenced patent. Thus, it will be understood that the output from the +I and −I lines of the fringes-to-inches converter represents a displacement of 12.5 microinches.

The +I and −I outputs of converter 19 are connected through identical scaling circuits 21 and 23, respectively, to corresponding outputs of a steering logic circuit 25. The steering logic circuit has a direction control input connected via line 27 to the NCU 13 which instructs the steering logic as to the assumed positive direction of movement of the slide 5.

The +I and −I signals are carried through the steering logic circuit and applied either in the same order or reverse lead order depending on the state of the direction line 27 to maintain the assumed positive direction operation to corresponding inputs of an anticoincidence circuit 19.

The command pulses on line 11 are applied to a separate input of anticoincidence circuit 29 through a scaling circuit 31 which insures that the command pulses and the interferometer feedback pulses are identically scaled. It will be understood that various scaling means may be employed to insure identical scaling for various numerical control units which may correspond to 10, 20, or 100 microinches per command pulse.

The anticoincidence circuit 29 assures that all command pulses and feedback pulses are presented at separate outputs which are in turn connected to a synchronous bidirectional counter. The command pulses are applied to the up (Up) count input of counter 31 while the interferometer feedback pulses are applied to the down (Dn) count input. The output of the counter is applied to a digital-to-analog converter 33 which continuously converts the count registered in the counter to an analog signal which is continuously recorded by means of a strip chart recorder 35 or other well-known recording means.

Referring now to FIG. 2, there is shown a logic diagram of the anticoincidence circuit 21 of FIG. 1. This circuit is the heart of the system in that it insures that an absolute count of both the command and interferometer feedback pulse is registered by counter 31 so that the dynamic error of the slide 5 may be recorded and assures that no information is lost. The circuit is operated by a clock 41 (typically 13 MHz) which has its output connected to the clock input (C) of a J/K flip-flop 43. The J/K flip-flop toggles each time a clock pulse is applied to the C input when the J, K and R (direct reset) inputs are high (+5V).

The reset output (Q) of flip-flop 43 is connected to the C input of another J/K flip-flop 45 while the set output (Q) of flip-flop 43 is connected to the C input of yet another J/K flip-flop 47. The J and K inputs of flip-flops 43 through 47 and the R input of flip-flop 43 are connected to a +5V supply. The Q output of flip-flop 45 is connected to the reset input of a reset/set (R/S) flip-flop 49 which is connected at the set input to receive the command pulses from the output of scaler 31. Flip-flop 47 is similarly connected to two R/S flip-flops 51 and 53. The Q output of flip-flop 47 is connected to the R inputs of both flip-flops 51 and 53. The S input of flip-flop 51 is connected to the +I output of the logic circuit 25 while the S input of flip-flop 53 is connected to the −I output of circuit 25.

The command pulse output to counter 31 is taken at the Q output of flip-flop 49 which is connected to the input of a one-shot multivibrator 55 and to the direct reset input of flip-flop 45. The positive direction interferometer output (+I) is taken at the Q output of flip-flop 51 which is connected to the input of a one-shot 57 and to the direct reset input of flip-flop 47 through an OR gate 59. The −I pulses are taken at the Q output of flip-flop 53 which is connected to another one-shot 61 and to a second input of OR gate 59.

Each of the one-shots (55, 57 and 61) are identical in that a fixed duration, typically 35 nanoseconds, pulse is provided at the output when the input goes negative from the resetting of the corresponding R/S flip-flop connected to their inputs. Since the −I interferometer pulses are to be recorded as an up count in counter 31, the outputs of one-shots 55 and 61 are connected to separate inputs of an OR gate 63 whose output is connected to the up count input of counter 31 (FIG. 1) while the +I pulses at the output of one-shot 57 are supplied to the Dn count input of counter 31 connected to the output of one-shot 57. Therefore, as will be described in detail hereinbelow, the anticoincidence circuit of FIG. 2 assures the counting of all command and interferometer feedback pulses so that an absolute error indication is continuously registered by counter 31 and continuously displayed by recorder 35.

In operation, the error monitor is based on the principle of measuring the difference between how far a positionable member such as the tool slide 5 should have moved from a reference position according to the number of command pulses applied thereto and how far it actually moved as measured by a position resolver, such as the laser interferometer. The feedback pulses from the laser interferometer indicate the true slide position from the reference point as the slide moves along the commanded path. These pulses are compared with the command pulses from the NCU 13 by means of the bidirectional counter 31. The algebraic sum registered by counter 31 as set forth above is the slide position error from the commanded position. Since most numerically controlled machines are designed for 10, 20 or 100 microinches of slide travel per command pulse from its control unit 13 the interferometer feedback pulses must be scaled to match the command pulses by means of scalers 21 and 23. By counting these pulses, the commanded travel can be determined; actual travel is measured by counting the fringe pulses from the interferometer 15. Typically, the quadrature outputs A and B from interferometer 15 represent a fringe distance of 12.457 microinches, the wave length of a He-Ne laser. The A and B signals are presented to the fringes-to-inches converter 19 which converts the pulses to represent 12.5 microinches per pulse as detailed in the referenced patent. The converter 19 includes a phase sequence detector at the input which detects the leading one of the quadrature signals A and B and if, for example, the A signal is leading the B signal, a pulse is presented at the +I output for one cycle of the A or B signals; if B is leading, a pulse is presented at the −I output of converter 19. Only one pulse, either a +I or −I pulse is presented for each fringe distance of movement detected by the interferometer 15.

The +I and −I pulses are then scaled by scalers 21 and 23, respectively, to match the command pulse value from the NCU 13 and applied to the steering logic circuit 25. Logic circuit 25 receives direction information via a logic signal level on line 27 from the NCU 13 to assure that interferometer pulses, representing motion in the commanded direction, always appear on the +I line at the output and that interferometer pulses, representing motion in the opposite direction, always appear on the −I output. The logic circuit 25 is made up of gates which are switched by the direction line 27 logic signal to reverse the outputs when the commanded direction of movement from the NCU 13 changes.

Referring now to FIG. 2, the anticoincidence circuit 29 is connected to receive the +I and −I outputs at respective inputs which are wired to the set inputs of flip-flops 51 and 53, respectively. The commanded pulses are applied to the set input of another flip-flop 49 as pointed out above. The purpose of the anticoincidence circuit is to separate the two interferometer signals and command signals and generate Up/Down pulses to the bidirectional counter 31 such that all command and interferometer pulses are instantaneously counted regardless of their time relationship. A command pulse or interferometer pulse will set the appropriate flip-flop (49, 51 and 53). A strobe pulse from the clock 41 then alternately resets these flip-flops and thereby generates a 35-nanosecond Up-or-Down pulse from the corresponding one-shot (55, 57 and 61).

A free-running 13 MHz clock provides the basic frequency. This frequency is divided in half by flip-flop 43 which produces complementing 6.5 MHz square waves at its outputs. These complementary square waves are used as clocks for J/K flip-flops 45 and 47. The reset inputs of the storage flip-flop 49 and flip-flops 51 and 53, are held high by the normally disabled flip-flops 45 and 47, respectively.

With the system initialized as above, a command pulse will set flip-flop 49; and since only one of the interferometer pulses (+I or −I) can be present in one fringe cycle of the interferometer, either flip-flop 51 or 53 may be set coincidently with the setting of flip-flop 49, enabling flip-flop 45 and flip-flop 47 via the high level applied to their direct reset inputs. Recalling that the clocks of flip-flops 45 and 47 are complements, it will be seen that these flip-flops will switch 180° apart. Assuming a +I (indicating an increment of movement in the commanded direction) interferometer pulse has set flip-flop 51 and that flip-flop 45 is switched first, flip-flop 49 will be reset and flip-flop 45 will be disabled until another command pulse sets flip-flop 45. Then flip-flop 47 will switch and reset flip-flop 51, which in turn disables flip-flop 47 until either another +I or −I pulse sets either flip-flop 51 or 53. The high-to-low transition of the Q outputs of flip-flop 49 and either flip-flop 51 or 53 will always be separated by at least one clock period regardless of the relationship of the command pulses and the interferometer feedback pulses, provided their maximum frequencies are always less than half that of the clock frequency. The high-to-low transitions of the Q outputs of flip-flops 49, 51 and 53 will trigger the corresponding one-shots 55, 61 or 57, respectively, which generate a 35-nanosecond negative going pulse count signal. The outputs of one-shots 55 and 61 are applied through OR gate 63 to the up count input of counter 31 and the output of one-shot 57 is applied to the Dn count input. As the command pulses are fed from the NCU 13 to the drive 11 they are counted by counter 31 in the up direction. When the slide 5 responds to the command pulses and begins to move in the commanded direction, the +I pulses, indicative of the movement will count the counter 31 down so that the net count, including the −I pulses which count the counter 31 up, registered by counter 31 is the instanteous slide 5 position error.

Thus, it will be seen that the count registered by the counter 31 is the instantaneous error at any position along the path of slide 5 travel including the lag between the commanded position and the actual slide position. The digital output of the counter may be fed to a commercially available 10-bit bipolar digital-to-analog converter 33 whose bipolar 10 volt output ($E_o$) is recorded on the strip chart recorder 35. A typical chart is shown in FIG. 3, wherein the error signal $E_o$ is plotted against the commanded slide position.

The chart of FIG. 3 shows the lead screw cyclic error by the peak-to-peak displacement of the cyclic waveform and vibration is shown by the small oscillation riding on the screw cyclic error waveform. The static position error may be checked at any point along the chart as at 71 by stopping the command pulses and allowing the chart to continue. If there were no position error the voltage would drop back to the base line from which the movement started. The system output ($E_o$) may be expressed as:

$$E_o = E_m + \epsilon_\lambda + \epsilon_F + \epsilon_s + \epsilon_D + \epsilon_R,$$

where:

$E_m$ represents the true machine slide error, $\epsilon_\lambda$ the error introduced by a change in the interferometer wave length $\lambda - 24.914380 \times 10^{-6}/\lambda$ inches/inches of slide travel $\epsilon_F$ the error introduced by the fringes-to-inches converter $\pm 6.25$ $\mu$in. $+ 0.16$ microinch/inch of slide travel $\epsilon_s$ the error due to limited interferometer resolution and various scaling circuits ($-1.25$ command pulses, maximum), $\epsilon_D$ the error introduced due to the DAC nonlinearity ($\pm 0.625$ command pulse, maxinum), and $\epsilon_R$ the error of the strip-chart recorder (typically $\pm 0.25$ percent of full scale, maximum).

The error monitor system was tested using a pulse output interferometer on a horizontal two-axis, numerically controlled turning machine. The environmental conditions resulted in an $\epsilon_\lambda$ of $+0.8$ microinch per inch of slide travel. The strip-chart recorder was operated with a span equivalent to 125 command pulses, giving an $\epsilon_R$ of $\pm 0.313$ command pulse. This value produces a theoretical maximum system error for these tests of $+ ]0.938 + (1/C_p) (6.25 + 0.96 T_s)]$, or $- (2.138 + 6.25/C_p)$ command pulses, where $T_s$ represents the slide travel in inches, and $C_p$ the command pulse value in microinches.

A series of static positioning tests was made to check the error monitor accuracy. After each 0.1-inch step, the interferometer readout was recorded and the commanded position substracted to give a calculated error. The experimentally measured system error was well within the theoretical limits.

The dynamic error measuring system can be used to observe the dynamic performance of a machine as well as to obtain data useful in dynamic error correction and machine maintenance. Instantaneous positioning error, following error, slide velocity variation, cyclic error, and slide response can be measured and recorded directly. These data may then be used to predict the contouring accuracy of the machine. Slide oscillation, excessive dynamic positioning error, resolver phase cyclic error, and "hunting" caused by faulty or improperly adjusted electrical or mechanical components can also be readily determined from the same recorded data. This information is extremely helpful in diagnosing mechanical and/or electrical maintenance problems. These positioning error data may also be used to determine mechanical or electronic compensating cam configurations. Error compensation based on this information is inherently more accurate since it is dynamic and continuous instead of a point-to-point measurement and discontinuous.

What is claimed is:

1. A position error monitoring system for a numerically controlled machine having a positionable member driven by a drive means when command pulses from a numerical control unit are fed to said drive means for commanding movement of said positionable member along a commanded direction path, comprising:

a bidirectional counter having an up count and down count input and digital output;

a digital-to-analog converter connected to the digital output of said counter to produce an analog signal at an output thereof proportional to the count in said counter;

means responsive to increments of movement of said positionable member for generating feedback pulses at a first output corresponding to the increments of movement in the commanded direction and at a second output corresponding to the increments of movement in the direction opposite said commanded direction;

an anticoincidence circuit including a clock pulse generator, a first flip-flop having at least set and reset outputs and a toggle input connected to the output of said clock pulse generator so that said set and reset outputs are alternately activated at a frequency of one-half the clock frequency, first, second and third bistable storage means operable to be set, respectively, in response to randomly generated pulses from said numerical control unit, said first output of said feedback generating means and said second output of said feedback generating means, first and second normally disabled bistable switching means each having a toggle input connected, respectively, to said set and reset outputs of said first flip-flop for alternately resetting said first bistable storage means and said second and third bistable storage means responsive to the set condition of a corresponding one of said first, second and third bistable storage means, a first output circuit means responsive to the resetting of said first or third bistable storage means for applying a pulse to the up count input of said counter, and a second output circuit means responsive to the resetting of said second bistable storage means for applying a pulse to the down count input of said counter; and analog recording means responsive to the output of said digital-to-analog converter for recording said analog signal, thereby recording the position error of said positionable member moved along the commanded direction path by said numerical control unit.

2. The error monitoring system as set forth in claim 1 wherein said first, second, and third bistable storage means are corresponding first, second and third R/D flip-flops each having set and reset inputs and at least a set output, said set inputs being connected, respectively, to receive the command pulses, feedback pulses from said first output of said feedback pulse generating means, and feedback pulses from said second output of said feedback generating means, and wherein said first and second normally disabled bistable switching means are corresponding first and second J-K flip-flops connected to be set by the first pulse applied from said first-named flip-flop following the application of one of said randomly generated pulses.

3. The error monitoring system as set forth in claim 2 wherein said first output circuit means includes a first one-shot multivibrator connected to the set output of said first R/S flip-flop, a second one-shot multivibrator connected to the set output of said set output of said third R/S flip-flop and an OR gate having first and second inputs connected, respectively, to the outputs of said first and second one-shots and an output connected to said up count input of said counter and wherein said second output circuit means includes a third one-shot multivibrator connected to the output of said second R/S flip-flop and an output connected to the down count input of said counter.

4. The error monitoring system as set forth in claim 3 wherein said feedback pulse generating means includes an interferometer for monitoring the movement of said positionable member.

5. The error monitoring system as set forth in claim 4 further including scaling means for scaling the feedback pulses from said interferometer to correspond to the incremental movement represented by said command pulses.

6. The error monitoring system as set forth in claim 5 wherein said feedback pulse generating means includes means responsive to a direction command from said numerical control unit for reversing the first and second outputs of said feedback pulse generating means in response to a change in the commanded direction path of said positionable member.

7. The error monitoring system as set forth in claim 6 wherein said analog recording means is a strip-chart recorder.

* * * * *